May 23, 1939.   C. DANUSER ET AL   2,159,257
APPARATUS FOR CONTROLLING THE TEMPERATURE OF FLUIDS
Filed Aug. 21, 1935   3 Sheets-Sheet 1

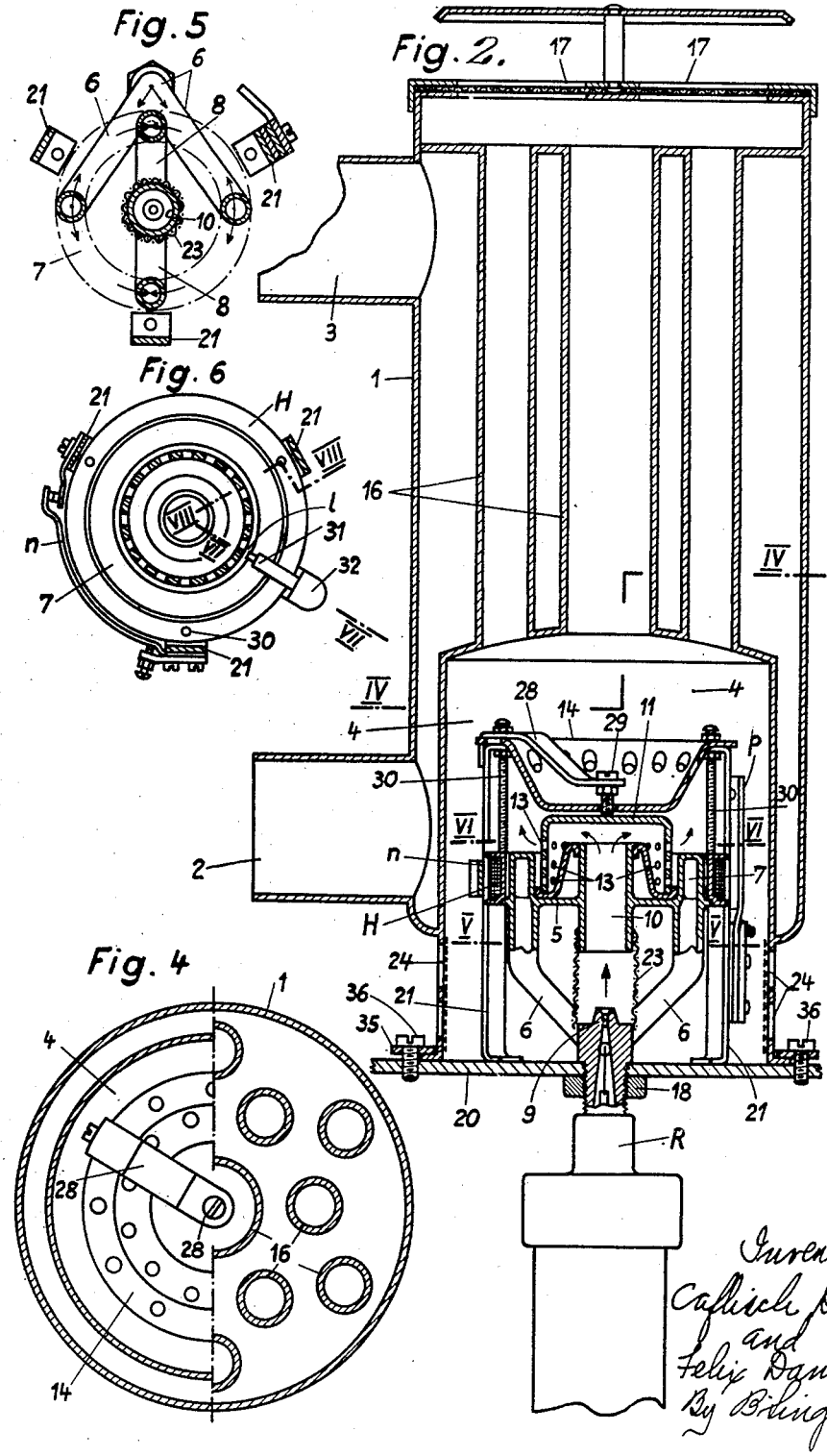

May 23, 1939.　　　C. DANUSER ET AL　　　2,159,257
APPARATUS FOR CONTROLLING THE TEMPERATURE OF FLUIDS
Filed Aug. 21, 1935　　　3 Sheets-Sheet 3

Inventors
Caflisch Danuser
and
Felix Danuser
By B. Singer Atty

Patented May 23, 1939

2,159,257

UNITED STATES PATENT OFFICE 2,159,257

APPARATUS FOR CONTROLLING THE TEMPERATURE OF FLUIDS

Caflisch Danuser, Zurich, and Felix Danuser, Kreuzlingen, Switzerland

Application August 21, 1935, Serial No. 37,250
In Switzerland August 29, 1934

1 Claim. (Cl. 158—28)

The invention relates to improvements in heating devices especially adapted for heating the cooling water in internal combustion engines and the like to prevent freezing and to facilitate starting of the engine.

The main object of the invention is to provide an apparatus adapted to be mounted as a fixed equipment on any motor car etc. The improved heating device, although very small in size, has a very high heating capacity which moreover may be varied according to requirements. The new device needs a minimum of attendance as the liquid fuel is automatically supplied from a large storage tank separated from the heating apparatus itself.

Another object of the invention is to provide means to automatically clean the nozzle of the burner to prevent a clogging of the fuel supply.

Still another object of the invention is to provide positively operated means to stop the supply of fuel if the ignition of the fuel fails.

The various features of novelty which characterize our invention are pointed out with particularity in the claim annexed to and forming part of this specification; but for a better understanding of the invention, however, its advantages and specific objects attained with its use, reference should be had to the accompanying drawings and descriptive matter in which we have illustrated and described preferred embodiments of our invention.

In the drawings:

Fig. 2 is a sectional elevation of the heat exchanger.

Figs. 4 to 6 are sections on the lines IV—IV, V—V, VI—VI of Fig. 2, respectively.

Fig. 11 is a detail view hereinafter referred to.

Figure 1:
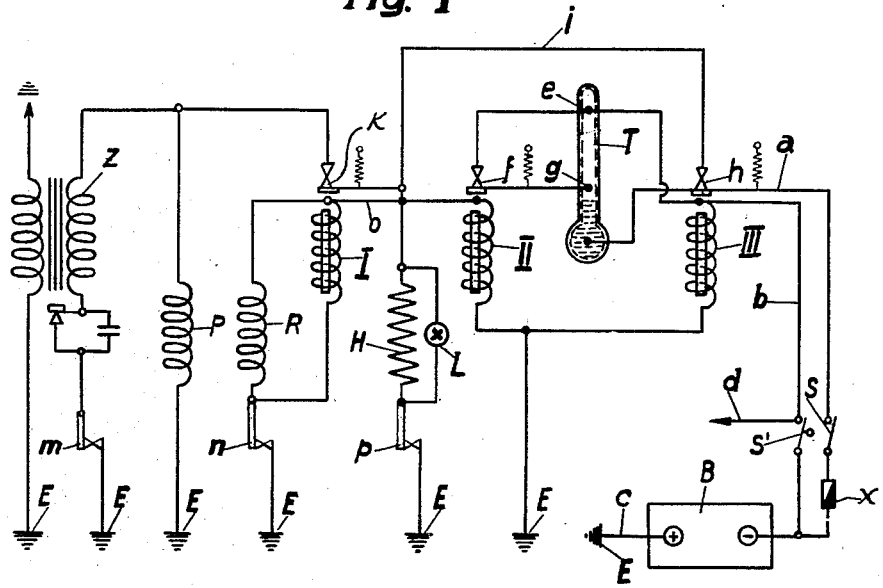
Fig. 1 shows the connection of the apparatus and parts thereof in a diagrammatical manner.
Figure 3:
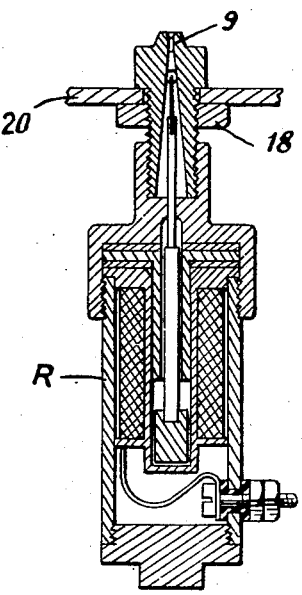
Fig. 3 is an enlarged detail vertical section of the nozzle cleaner.
Figure 9:
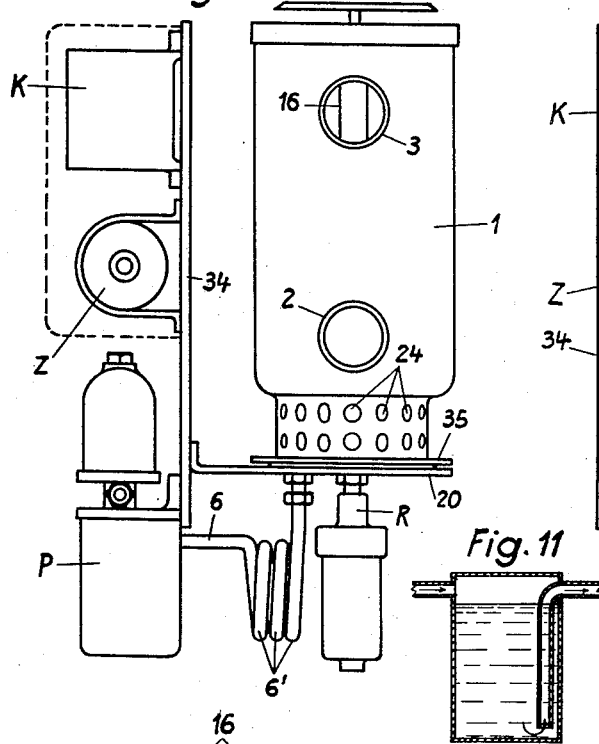
Fig. 9 shows in side elevation the assembled parts of the apparatus, viz. the heat exchanger, the relays, the ignition device, the fuel pump, etc.
Figure 10:
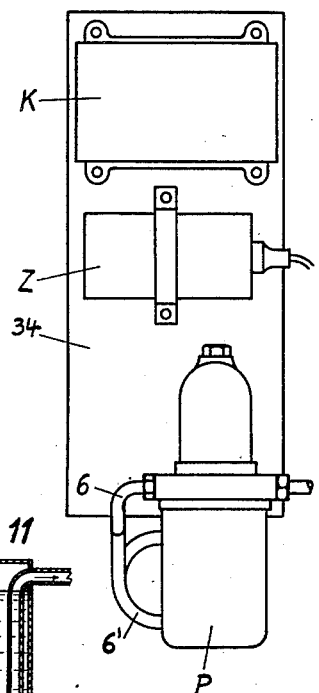
Fig. 10 illustrates the same parts as Fig. 9, but in front elevation.

In Fig. 1 of the drawings is shown diagrammatically the layout of the apparatus including the electrical circuits. In this Figure E indicates ground, i. e. the frame of the vehicle or the engine; B indicates the usual storage battery, and S' the usual ignition switch; S indicates a switch for turning on and off the water heating apparatus which constitutes the principal part of the present invention.

T represents a thermostat which is located within the sphere of influence of the water to be heated. It may comprise a mercury thermometer which is provided with two contact pins $g$ and $e$ located at certain distances apart, and a constant connection from the mercury in the bulb to a circuit wire $a$ from switch S. Switch S is electrically connected to the ungrounded terminal of the battery B, preferably through a thermostatic switch $x$ or cut-off, hereinafter again referred to. The switch S' is connected with the ungrounded terminal of the battery and with the usual wire $d$ leading to the ignition circuit of the engine, and with a wire $b$ which leads to contact pin $e$ and to the electro-magnet III of a circuit opener and closer (relay) having normally closed contacts $h$ which are adapted to be opened when electro-magnet III becomes energized, as will be later explained. The electro-magnet III has its other terminal grounded, as at E.

A second circuit opener and closer (relay) is provided whose electro-magnet II has a terminal grounded at E and its other terminal connected by wire $i$ to the fixed one of contacts $h$.

The heating coil H of the water heater I, hereinafter specifically described, and a signal lamp L in parallel therewith, have one common terminal grounded at E through a bi-metallic circuit opener $p$ (thermally controlled), while the other common terminal is connected with wire $i$.

R designates the fuel nozzle cleaning device, also later specifically described, and I is the electro-magnet of a third circuit opener and closer (relay) having normally closed contacts $k$, which electro-magnet is connected in parallel with the cleaning device R. One common terminal of the members R and I is grounded at E through a bi-metallic (thermally controlled) circuit opener $n$.

The fuel pump is designated by the reference letter P in Fig. 1, and it has one terminal of its operating coil grounded at E, while the other terminal thereof connects to the fixed one of the contacts $k$.

Z designates the primary coil of an ignition device for producing a spark at $l$ to ignite the fuel for the burner of the heater I, hereinafter more fully described. The coil Z has one terminal connected to the fixed one of the contacts $k$, while its other terminal is grounded through a bi-metallic (thermally controlled) circuit opener $m$.

The heating device for the cooling water of the motor comprises a burner adapted for fuel, preferably a hydro-carbon, such as petrol, benzine, etc. The burner may be of any known appropriate type. The fuel is supplied to the burner by means of an electric pump P, as hereinafter described. The device R prevents any interruption in the fuel supply to the burner and the extinction of the flame of the burner.

A preferred embodiment of our invention is shown in the Figures 3 to 10.

The device comprises a boiler 1 having a water inlet 2 and a water outlet 3. In a combustion chamber 4 within the shell of the boiler 1 a fuel burner 5 is arranged. The fuel is fed by the pump P through a pipe 6 to the annular groove 7. There the said fuel evaporates and the vapor flows through pipes 8, 8', nozzle 9 and outlet 10 to the head 11 of the burner. The vapor mixed with air escapes through apertures 13 and is ignited in a manner hereinafter set forth. The hot gases thereby produced are distributed by a cover 14 and flow upwards through pipes 16, thereby heating the surrounding walls and therewith the water in the boiler. The hot gases leave the heat exchanger or boiler 1 through apertures 17. Burner 5 is secured to a base plate 20 by means of a nut 18. The cover 14 is also fixed to the said plate 20 by three supports 21. Pump P may be of any suitable well-known construction. It sucks fuel from a storage tank and forces said fuel through pipe 6 to the burner 5. In some cases it may be preferable to arrange a choke in pipe 6, but this modification is not shown in the drawings. Said choke, which may consist of a plurality of felt or metal discs, imparts to the fuel a constant velocity and prevents the intermittent feeding of the fuel by the pump from influencing the steady flame of the burner. At 6' between choke and burner the pipe 6 is helically wound so as to obviate the back-firing of the burner to the fuel container, as the evaporated fuel will be sufficiently cooled in said coil 6' of pipe 6.

23 is a strainer disposed between nozzle 9 and outlet 10, its purpose being to keep back any impurity from said nozzle 9. Fresh air is supplied to the burner 5 through openings 24 in the outer wall of the heat exchanger, said openings being similarly covered by a strainer or the like.

The bi-metal contact p is fixed to one of the supports 21, whereas the other bi-metallic strip n is disposed between the two other supports 21. The last mentioned bi-metal contact n is arranged very near the heat source H. Secured to the edge of the cover 14 is a further bi-metal strip 28 bearing at one end an adjusting nut 29 bearing always against head 11 of the burner and pressing the same downwardly. When set in operation the burner becomes hot and strip 28 therefore presses the head 11 more firmly on its base so as to prevent any rattling when the vehicle is moving. The heating resistance wire H is clamped to the annular channel 7 by nuts and screws 30.

A spark to ignite the vapors escaping is produced between head 11 and a rod 31 fixed to a tube 32 of insulating material, said tube 32 being secured to base plate 20 by clamping means 33. Plate 20 is secured to a mounting plate 34 to which also pump P, ignition device Z and relays I, II, III, enclosed in a casing K, are fastened. A protecting cap may be provided for apparatus Z and casing K. The wall of the heat exchanger 1 is provided at its lower end with flanges extending below the clamping ring 35 fixed to plate 20. By slightly turning the screws 36, heat exchanger 1 may be rotated about its axis according to the direction from which the water inlet pipes come.

Assume that the cooling water of the engine and radiator is below 20 degrees centigrade. The operator, before turning on the switch S' (which controls the ignition circuit to the spark plugs of the engine), closes the switch S. Current from battery B, upon closing of switch S, then flows through wire a, contacts h, wire i, contacts k, pump P, ignition coil Z, heater H, lamp L, fuel nozzle cleaner R, and coils I and II. Since coil I is at once energized, the circuit is immediately opened at contacts k and the current flows to pump P and spark coil Z is interrupted before any substantial operation of either P or Z takes place; also coil II opens the contacts f to open sub-circuit g, f, e, b at that point. As soon as the heating resistance H has attained the required preheating temperature to evaporate the fuel, the bi-metallic contact n opens the circuit of the nozzle cleaner R and the relay coil I, which permits contacts k to close again and current to flow through the pump circuit and through the ignition device Z, thereby igniting the fuel at burner head 11, which fuel is being pumped thereto by pump P. The ignited fuel at burner 11 now heats the water of the cooling system in boiler 1. The temperature of the burning fuel vapors causes the bi-metallic contacts m and p to open, thus deenergizing coil Z, heater H and lamp L. The fuel pump P continues working and the ignited fuel at burner head 11 continues to burn and the temperature of the water continues to rise. As the temperature rises the mercury in thermostat T will reach contact pin g, but no current will flow because the sub-circuit is still open at f (magnet II being still energized).

If at this point the operator wishes to start his car, he closes switch S', which immediately causes an energization of the electro-magnet III and opens the circuit at h, thereby stopping pump P and allowing burner flame to go out. If, however, the operator is not yet desirous of starting his car, the heating of the water continues until a temperature of 35 degrees C. is reached, whereupon the mercury in the thermostat T will have reached contact pin e and current will now flow from b to c and through magnet III to open the circuit at h which stops the pump P, de-energizes coil II and permits the burner flame to become extinguished, thus stopping the operation of the apparatus.

As coil II is de-energized, the circuit at f is closed. This produces no effect at the time except to prevent the circuit through the magnet III from opening until the mercury has fallen below contact pin g (at 20 degrees C.), when the circuit through magnet III will be opened and contacts h be permitted to close again to reset the apparatus for its next cycle of operation.

The closing of switch S' at any stage of the operation of the apparatus will of course at once open the circuit at h and stop the action of the apparatus, the cooling water being then heated by the motor.

The bi-metal contact X may be inserted into the main circuit of the heating device and is so designed as to switch off the current in case of overheating, for instance if there is no water left either in the motor, viz. in the cylinder jackets of the motor or in the boiler of the heating device. Thus said boiler is protected from overheating.

Figure 11:
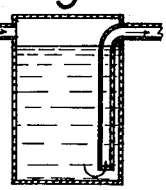
Figure 7:
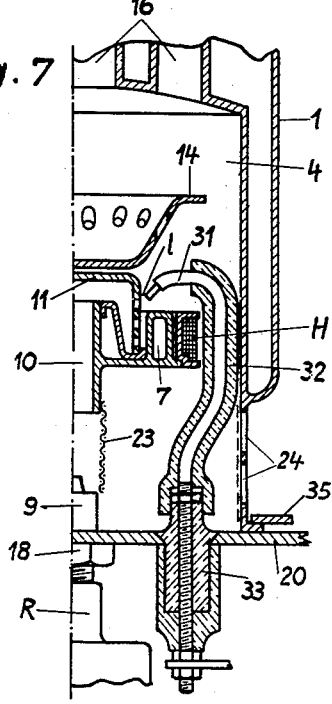
Figs. 7 and 8 are sections taken on lines VII—VII and VIII—VIII of Fig. 6 respectively.
Figure 8:
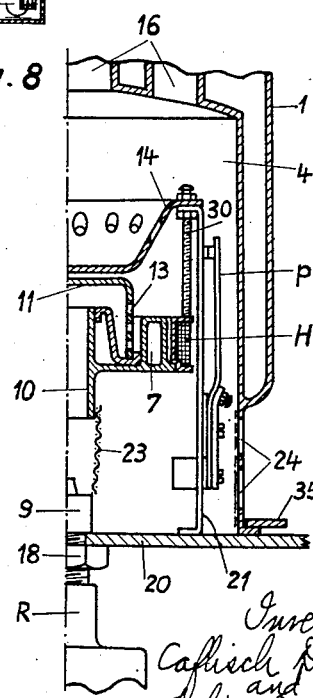

Preferably, a closed container or chamber is inserted in the inlet pipe of pump P as a protector (see Figure 11) to enable the heating device to work for some hours when there is no fuel left in the tank of the vehicle, thus protecting the motor even in such a case from freezing. The inlet pipe opens at the top of the said closed container, whereas the outlet pipe is designed as an immersion pipe.

Instead of a relay I, a bi-metal switch might be used. Of course the spark ignition device may be substituted by a glowing resistance coil of any known construction. The bi-metal contacts are preferably held under tension. In many cases a catalytic heating device might be preferable to the heating device above described.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

This application is a continuation in part of the application filed March 1, 1933, on which Patent No. 2,074,168 was issued March 16, 1937.

Having thus described our invention, what we claim as new and desire to secure by Letters Patent is:

An apparatus for controlling the temperature of water comprising, in combination a water heater that includes an electrically controlled burner, said burner including a nozzle having a tapering passage from its inlet end to adjacent its outlet end with the portion of the passage of greatest diameter at the inlet end; a thermostat located within the sphere of influence of the water; a bi-metallic circuit breaker; an electric circuit including a source of current supply, said bi-metallic circuit breaker, said thermostat and said electrically controlled burner for controlling the action of said burner; a nozzle cleaner for the burner; and means for actuating said nozzle cleaner when the burner is rendered operative; said nozzle cleaner comprising an electro-magnet coil, an armature core, a bushing in which said core is loosely guided, a cleaning needle carried by said core and projecting through the inlet end into said nozzle, said core and said needle being advanced when the coil is energized and being returned by gravity when the coil is de-energized, the diameter of the needle being less than the least internal diameter of said nozzle passage.

CAFLISCH DANUSER.
FELIX DANUSER.